3,806,413
PROCESS FOR PRODUCING RIBOSIDES OF
1H-PYRAZOLO (3,4-d) PYRIMIDINES
Kiyoshi Nakayama, Sagamihara, Japan, assignor to Kyowa Hakko Kogyo Co., Ltd., Tokyo, Japan
No Drawing. Continuation of abandoned application Ser. No. 667,342, Sept. 13, 1967. This application June 13, 1968, Ser. No. 736,573
Claims priority, application Japan, Sept. 16, 1966, 41/60,745
Int. Cl. C12d 13/06
U.S. Cl. 195—28 N                9 Claims

ABSTRACT OF THE DISCLOSURE

The present disclosure to a process for the production of 1-$\beta$-D-ribofuranosides of 1H-pyrazolo(3,4-d)pyrimidine by fermentation. It has been disclosed that when bacteria (Class, Schizomycetes) or yeasts are cultivated in culture media which contain 1H-pyrazolo(3,4-d) pyrimidine or its derivatives having hydroxyl and/or amino groups, the corresponding 1-$\beta$-D-ribofuranosides of 1H-pyrazolo(3,4-d)pyrimidines may be formed and accumulated in the culture media and in the cells of the microorganism.

CROSS-REFERENCE TO RELATED APPLICATION

This application is a continuation application of copending application of U.S. Ser. No. 667,342 filed on Sept. 13, 1967 and now abandoned.

The present invention relates to a process for producing 1-$\beta$-D-ribofuranosides of 1H-pyrazolo(3,4-d)pyrimidine derivatives by a fermentative method.

It has been known that several kinds of molds are capable of effecting the conversion of 1H-pyrazolo(3,4-d) pyrimidine and 4-amino 1H-pyrazolo(3,4-d)pyrimidine added into the culture media into the corresponding ribosides, respectively (P. J. Curtis and J. R. Thomas, Biochemical Journal, vol. 82, p. 381, 1962). It has hitherto been unknown to the art, however, that such conversion as above can be effected by using bacteria (Class, Schizomycetes), or yeasts.

It is an object of the present invention to produce 1-$\beta$-D-ribofuranosides of 1H-pyrazolo(3,4-d)pyrimidine derivatives by fermentation using a microorganism selected from the group consisting of bacteria (Class, Schizomycetes) or yeasts at low cost on a commercial scale.

The 1-$\beta$-D-ribofuranosides of 1H-pyrazolo(3,4-d) pyrimidine derivatives referred to in the present invention are those represented by the following constitutional Formula II

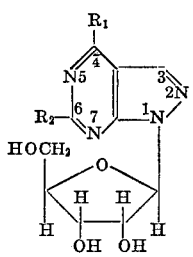

wherein $R_1$ and $R_2$ respectively represent functional groups of either H, OH or $NH_2$.

These compounds are structural analogues of the purine base and purine riboside in nucleic acid; 1H-pyrazolo(3,4-d)pyrimidine derivatives represented by the following Formula I have not only cancer-inhibiting activity but also some of them [4 - oxy 1H-pyrazolo(3,4-d)pyrimidine and 4,6-dioxy 1H-pyrazolo(3,4-d)pyrimidine] are inhibitors of xanthine-oxidase, and have been marked as excellent therapeutic agents for gout. It is however, expected that the ribosides of the Formula II prepared in accordance with the present invention may have activities equal to or much stronger than such activities of these derivatives

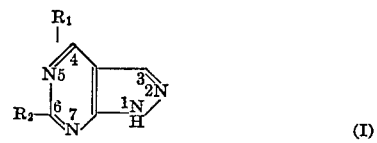
(I)

wherein $R_1$ and $R_2$ respectively represent functional groups of either H, OH or $NH_2$.

The present inventors have extensively studied the methods of producing ribosides utilizing microorganisms. As a result, it has been found that when a pyrazolopyrimidine derivative having the aforesaid Formula I is allowed to be present in a culture medium at any time where a microorganism is cultivated, 1-$\beta$-D-ribofuranoside of the compound of the Formula I, i.e. the compound of the Formula II is formed and accumulated in the culture (fermentation liquor and microbial cells). The formation of the riboside of 1H-pyrazolo(3,4-d)pyrimidine derivatives by bacteria and yeasts was not previously known and the present invention is based on the discovery of this phenomenon.

The most important feature of the present invention resides in that the compounds represented by the Formula I are added to the culture media.

The strains of Schizomycetes and yeast suitable for the production of the said riboside are widely distributed through the natural world and are not confined to certain genera or species.

As the culture medium used in the present invention, any medium may be used as long as it contains a pyrazolopyrimidine derivative having the structure of the Formula I. Extremely speaking, the object of the present invention can be accomplished by culturing the microbial cells in an aqueous solution containing only the compound represented by the Formula I, whereby the compound having the Formula II is formed in the culture. In general, the aqueous media which contain a carbon source (such as glucose, starch hydrolysates and molasses and other organic compounds), phosphoric acid compounds (such as potassium phosphate), a nitrogen source (such as urea, ammonium chloride, ammonium sulfate and ammonium nitrate, nitrogen-containing natural products such as yeast extract, corn steep liquor, meat extract, peptone and fish meal) and inorganic salts, are employed. Ribose-1-phosphate, purine nucleosides (such as adenosine, inosine and guanosine) and pyrimidine nucleosides (such as uridine and citosine) also may be used as carbon sources.

The pyrazolopyrimidine derivatives represented by the Formula I may be allowed to contact with the microorganism employed at any time during the culturing in the culture medium. Thus, the said pyrazolopyrimidine derivative may be added into the medium at the beginning of the fermentation or it may be added into the medium during the course of the culturing or it can be added into the medium intermittently in small portions.

The amount of the pyrazolopyrimidine deripative represented by the Formula I which is to be added into the medium may be varied over a wide range. It is possible to use a high concentration of the said pyrazolopyrimidine derivative when the culturing is carried out using a large amount of microbial cells of the microorganism employed under the culturing conditions where no substantial growth of the said microorganism is accompanied. On the one hand, in the culturing where growth of the microorganism is accompanied, it is preferable to add intermittently in small portions, because the addition at a high concentration may inhibit the growth of the microorganism.

As the culturing conditions other than those specifically defined in the present invention, the culturing conditions commonly used may be adopted therefor. Furthermore, the conventional methods may be adopted therefor. Furthermore, the conventional methods may be adoptable in the isolation of the riboside having the structure of the Formula II from the fermentation medium and microbial cells, and in the purification thereof. That is, the riboside is extracted from the microbial cells with perchloric acid, hot alcohol, etc. The riboside contained in the fermentation liquor may be recovered by means of ion-exchange resin treatment, active carbon adsorption treatment, etc. as shown in Example 1.

The following illustrative but non-limitive examples of presently preferred embodiments of the invention will be given to further explain the present invention.

EXAMPLE 1

An inoculant culture was prepared by cultivating *Bacillus subtilis* ATCC 19062 in a medium containing 2% of glucose, 1% of peptone, 1% of yeast extract and 0.3% of NaCl, respectively weight/volume percentage, and 30 μg./l. of biotin, at 30° C. for 24 hours. The fermentation medium was inoculated with the inoculant culture (in 10% by volume); both media are used after 20 ml. portions of them were put into 250 ml. Erlenmeyer flasks and sterilized. The fermentation medium has the following composition and the fermentation was carried out by shaking the culture at 30° C.

Composition of the fermentation medium (weight/volume percentage)

| | |
|---|---|
| Glucose | 10 |
| Yeast extract | 1 |
| $(NH_4)_2SO_4$ | 1 |
| $K_2HPO_4$ | 0.6 |
| $KH_2PO_4$ | 0.6 |
| $MgSO_4 \cdot 7H_2O$ | 0.6 |
| $CaCO_3$ | 2 |

The above quantities were dissolved in water to prepare an aqueous medium, and the pH thereof was adjusted to 8.2 with 5 N NaOH before sterilization. When the cultivation was performed for 48 hrs., 4-hydroxy 1H-pyrazole-(3,4-d)-pyrimidine was added so that its concentration in the fermentation liquor may reach 2 mg./ml., and the fermentation was continued further for an additional 48 hours. As a result, 4-hydroxy 1H-pyrazolo(3,4-d)pyrimidine -1-β-D-ribofuranoside having a concentration of 1.5 mg./ml. was formed and accumulated in the fermentation liquor.

The riboside thus formed was adsorbed on a polystyrene strongly basic ion exchange resin Dowex 1 (a trade name of a product produced by Dow Chemical Co., U.S.A.) (formic acid type) and eluted with formic acid. The riboside-containing fraction was neutralized and was then adsorbed on active carbon, which was eluted with a 50% ethanol containing 3% $NH_4OH$. The solvent was concentrated and evaporated to recover riboside in the form of powder.

EXAMPLE 2

Cultivation was carried out in the same manner as in Example 1, except that 4-amino 1H-pyrazolo(3,4-d)pyrimidine was used in place of the 4-hydroxy 1H-pyrazolo-3,4-d)pyrimidine. As a result, 4-amino 1H-pyrazolo(3,4-d) pyrimidine-1-β-D-ribofuranoside having a concentration of 1.1 mg./ml. was formed and accumulated in the fermentation liquor.

EXAMPLE 3

Cultivation was carried out in the same manner as in Example 1, except that 6-amino 4-hydroxy 1H-pyrazolo-(3,4-d)-pyrimidine was used in place of the 4-hydroxy 1H-pyrazolo(3,4-d)-pyrimidine. As the result, 6-amino 4-hydroxy 1H - pyrazolo(3,4-d) - pyrimidine-1-β-D-ribofuranoside having a concentration of 0.7 mg./ml. was formed and accumulated in the fermentation liquor.

EXAMPLE 4

5 ml. portions of reaction liquids containing 500 mg. each of various kinds of living microbial cells (weight calculated as dry weight), 25 mg. of 4-hydroxy 1H-pyrazolo(3,4-d)pyrimidine, 50 mg. of $KH_2PO_4$, and 0.1 mg. of $MgCl_2$ were cultured at 30° C. for 5 hours. The culture mixtures were extracted with addition of 5 ml. of 1 N cold perchloric acid, and the extracts were neutralized with 10 N NaOH. 0.1 g. of active carbon was added thereto, shaken for 10 minutes, and then filtered. The active carbon was washed with 20 ml. of water and eluted with 5 ml. of ethanol-ammonia mixed solution (25%, 0.5 N). The eluates were concentrated to make up 1 ml. each. The concentrated liquids were subjected to paper chromatography to determine the formation and presence of 4-hydroxy 1H - pyrazolo(3,4-d)pyrimidine-1-β-D-ribofuranoside contained therein. The results are shown in Table 1.

TABLE 1

| Microorganism employed | Formation of 4-hydroxy 1H-pyrazolo(3,4-d)-pyrimidine-1-β-D-ribofuranoside |
|---|---|
| *Aerobacter aerogenes* ATCC 8308 | + |
| *Arthrobacter ureafaciens* ATCC 15762 | + |
| *Bacillus sphaericus* ATCC 10208 | + |
| *Bacillus subtilis* ATCC 13952 | + |
| *Bacillus subtilis* ATCC 19062 | + |
| *Sarcina lutea* ATCC 15176 | + |
| *Escherichia coli* ATCC 10798 | + |
| *Micrococcus luteus* ATCC 398 | + |
| *Pseudomonas boreopolis* ATCC 15452 | + |
| *Saccharomycen cerevisiae* ATCC 15248 | + |
| *Zygosaccharomyces major* ATCC 15249 | + |
| *Candida tropicalis* ATCC 15114 | + |
| *Streptomyces fradiae* ATCC 19063 | + |
| *Streptomyces aureus* ATCC 3309 | + |

EXAMPLE 5

Cultivation was carried out in the same manner as in Example 1, except that *Streptomyces fradiae* ATCC 19063 was used in place of the *Bacillus subtilis* ATCC 19062. As a result, 4-oxy 1H-pyrazolo(3,4-d)pyrimidine-1-β-D-ribofuranoside having a concentration of 0.3 mg./ml. was formed in the fermentation liquor.

I claim:

1. A process for producing a 1-β-D-ribofuranoside of 1H-pyrazolo(3,4-d)pyrimidine, which comprises culturing a microorganism selected from the group consisting of members of the class, Schizomycetes and yeasts in a culture medium containing a 1H-pyrazolo(3,4-d)pyrimidine derivative represented by the formula

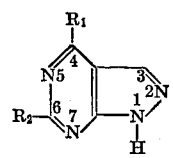

wherein $R_1$ and $R_2$ respectively represent a member selected from the group consisting of H, OH and $NH_2$, converting said pyrazolo pyrimidine derivative into a 1-β-

D-ribofuranoside of 1H-pyrazolo(3,4-d)pyrimidine represented by the formula

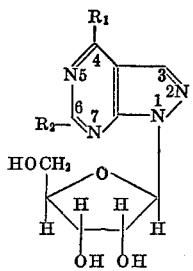

wherein $R_1$ and $R_2$ respectively have the same meanings as identified above, accumulating said 1-β-D-ribofuranoside in the culture medium and recovering said ribofuranoside therefrom.

2. A process according to claim 1, wherein the 1H-pyrazolo(3,4-d)pyrimidine derivative is 4-hydroxy-1H-pyrazolo(3,4-d)pyrimidine.

3. A process according to claim 1, wherein the 1H-pyrazolo(3,4-d)pyrimidine derivative is 4-amino-1H-pyrazolo(3,4-d)pyrimidine.

4. A process according to claim 1, wherein the 1H-pyrazolo(3,4-d)pyrimidine derivative is 4-hydroxy-6-amino-1H-pyrazolo(3,4-d)pyrimidine.

5. A process according to claim 1, wherein the microorganism is selected from the group consisting of Zygosaccharomyces major, Candida tropicalis, Streptomyces fradiae, Streptomyces aureus, Aerobacter aerogenes, Arthrobacter ureafaciens, Bacillus spaericus, Bacillus subtilis, Sarcina lutea, Escherichia coli, Micrococcus luteus, Pseudomonas boreopolis and Saccharomyces cerevisiae.

6. A process according to claim 1, wherein the culture medium contains a carbon source, phosphoric acid compounds, nutrient inorganic salts and a nitrogen source.

7. A process according to claim 1, wherein the microorganism is Bacillus subtilis ATCC 19062.

8. A process according to claim 1, wherein the microorganism is Streptomyces fradiae ATCC 19063.

9. A process according to claim 1, wherein the microorganism is selected from the group consisting of Aerobacter aerogenes, ATCC 8308, Arthrobacter ureafaciens ATCC 15762, Bacillus sphaericus ATCC 10208, Bacillus subtilis ATCC 13952, Bacillus subtilis ATCC 19062, Sarcina lutea ATCC 15176, Escherichia coli ATCC 10798, Micrococcus luteus ATCC 398, Pseudomonas boreopolis ATCC 15452, Saccharomyces cervisiae ATCC 15248, Zygosaccharomyces major ATCC 15249, Candida tropicalis ATCC 15114, Streptomyces fradiae ATCC 19063, and Streptomyces aureus ATCC 3309.

References Cited
UNITED STATES PATENTS 3,535,207    10/1970    Shiro et al. _____ 195—28 N
3,135,666     6/1964    Hara et al. _____ 195—28 N

OTHER REFERENCES

Curtis et al., Biochemical Journal, vol. 82, pp. 381–384 (1962).

ALVIN E. TANENHOLTZ, Primary Examiner